Feb. 28, 1950     E. A. GLYNN     2,498,953
TIRE TREAD APPLYING MACHINE

Filed June 22, 1948     2 Sheets—Sheet 1

INVENTOR
E. A. Glynn

Feb. 28, 1950 E. A. GLYNN 2,498,953
TIRE TREAD APPLYING MACHINE
Filed June 22, 1948 2 Sheets-Sheet 2
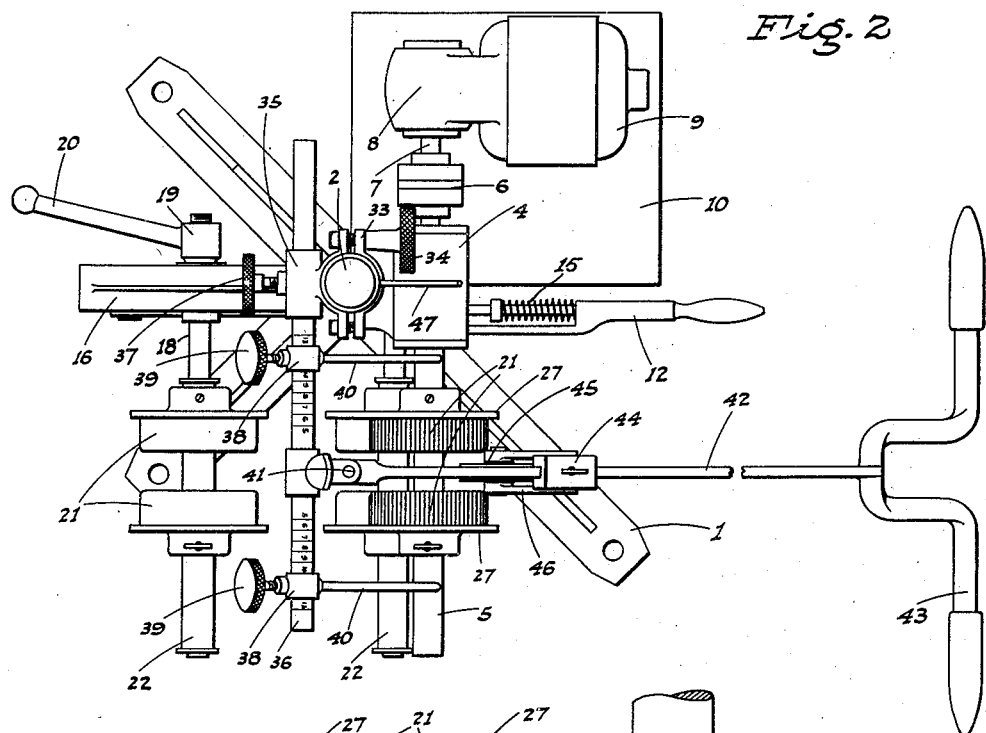
Fig. 2
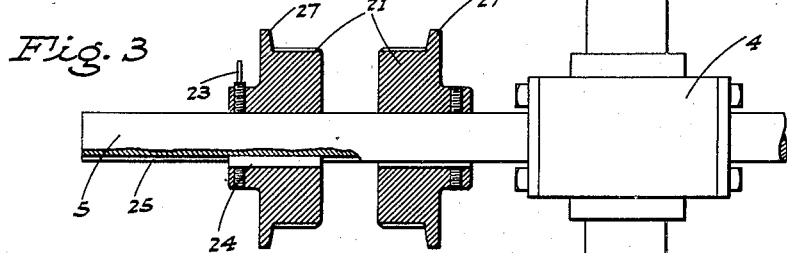
Fig. 3
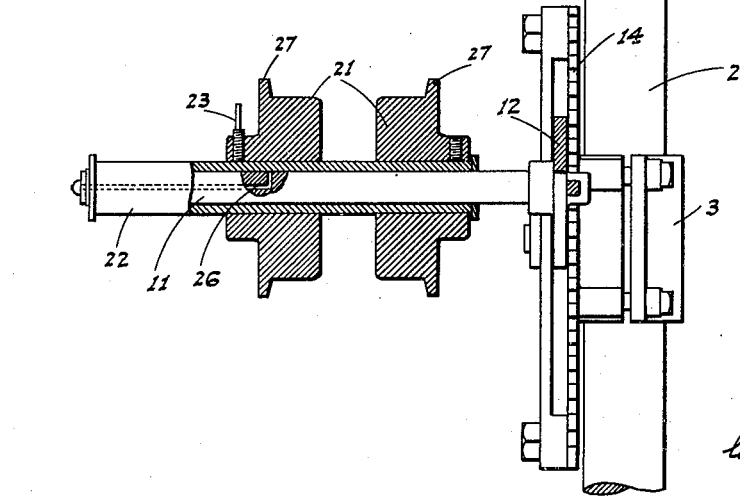
INVENTOR
E. A. Glynn
ATTORNEYS Patented Feb. 28, 1950

2,498,953

UNITED STATES PATENT OFFICE 2,498,953

TIRE TREAD APPLYING MACHINE

Edwin A. Glynn, Lodi, Calif., assignor to Super Mold Corporation of California, Lodi, Calif., a corporation of California Application June 22, 1948, Serial No. 34,427

16 Claims. (Cl. 154—9)

1

This invention relates to, and it is an object to provide, a novel machine for use in connection with the application of tread stock, or camelback—as it is known in the tire rebuilding trade—to used tires preparatory to vulcanizing the new tread in place.

Another object of the invention is to provide a tire tread applying machine incorporating a driven tire carrier adapted to support a tire, with its axis horizontal, and to rotate the tire about said axis to facilitate application of the tread stock; there being a novel guide assembly on the machine operative to assure straight and even application of said tread stock to the tire.

A further object of the invention is to provide a tire tread applying machine which includes a novel "stitcher" unit arranged to ride the applied tread stock smoothly and in easy tracking relation, while at the same time applying relatively great pressure to said tread stock to cause its proper adherence to the tire. In the trade a "stitcher" is the device employed to press the applied tread stock forcefully against the previously prepared and rubber cemented periphery of a tire carcass.

An additional object of the invention is to provide a tire tread applying machine wherein the driven tire carrier, guide assembly, and tread stock stitcher unit are each adjustable so that the machine can be used effectively with tires of different sizes, the adjustments all being accomplished easily, quickly, and without use of tools.

A further object of the invention is to provide a practical, convenient, and reliable tire tread applying machine, and one which will be exceedingly effective for the purpose for which it is designed.

These objects are accomplished by means of such structure and relative arrangement of parts as will fully appear by a perusal of the following specification and claims.

In the drawings:

Fig. 2 is a top plan view of the machine.

Fig. 3 is an enlarged fragmentary front elevation, partly in section, showing the driven, roller-supporting spindle, and the vertically adjustable roller-supporting spindle.

Fig. 4 is a diagrammatic representation showing the relationship of the tire carrier rollers, and the stitcher unit roller to a supported tire.

Figure 1:
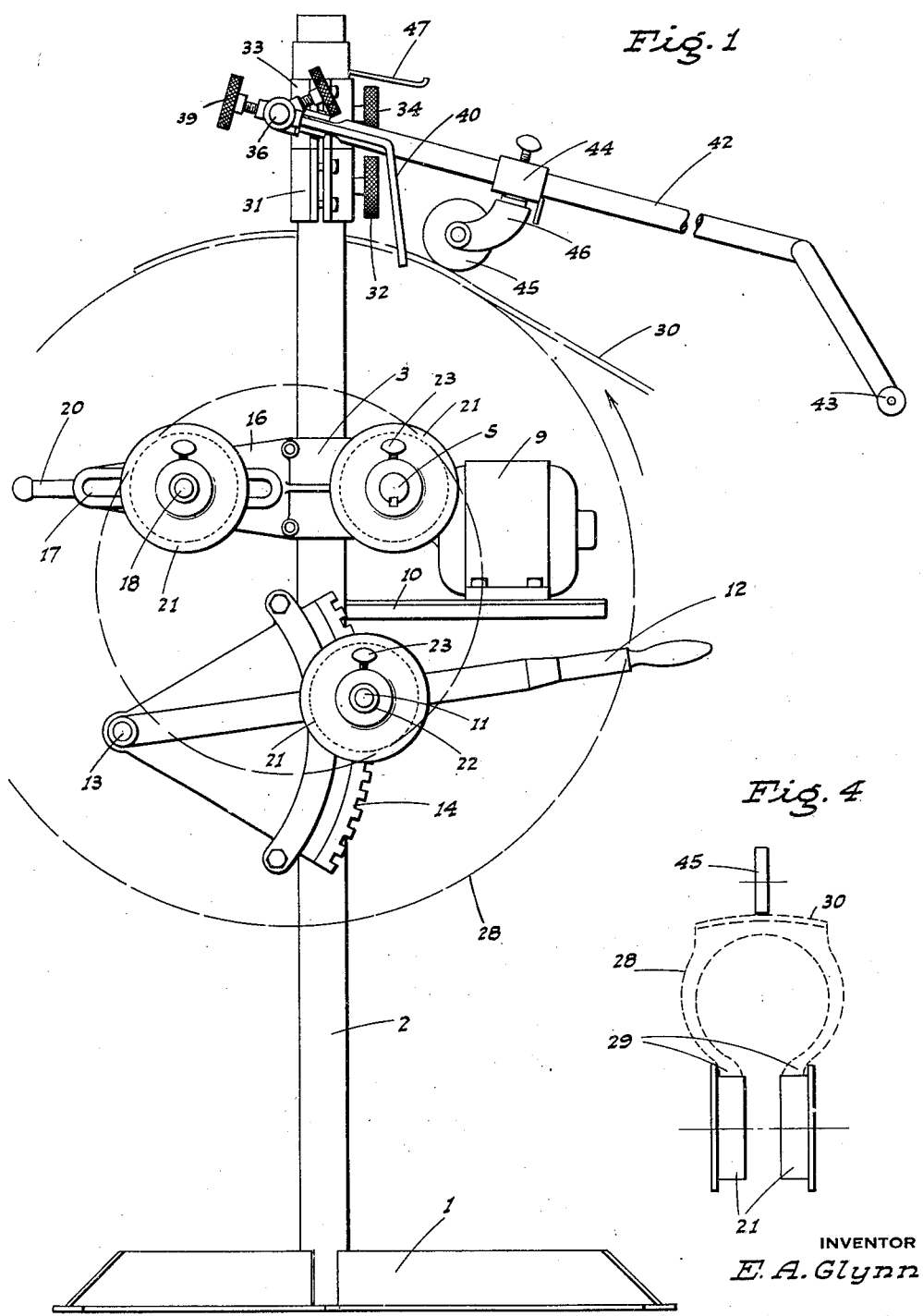
Fig. 1 is a side elevation of the machine as in use.

Referring now more particularly to the characters of reference on the drawings, the device is supported from the floor and comprises a base 1 on which a rigid post 2 is mounted.

A split sleeve 3 is fixed to the post 2 intermediate the ends of the latter, and at the front thereof said split sleeve 3 carries a transverse horizontal axis bearing 4 in which a spindle 5 is journaled. The spindle 5 projects laterally and horizontally in one direction a substantial distance and forms a part of the driven tire carrier, as will hereinafter appear.

At its opposite end the spindle 5 extends from the bearing 4 and is connected by a universal coupling 6 with the output shaft 7 of a reduction gear box 8 driven by an electric motor 9. The gear box 8 and electric motor 9 are mounted on a platform 10 secured in connection with the post 2.

The driven tire carrier of the machine, which includes the spindle 5, comprises the following structural arrangement:

Below the spindle 5 there is another horizontal spindle 11 which projects laterally in the same direction, and said spindle 11 is fixed, at its inner end, to a forwardly projecting hand lever 12 intermediate the ends of the latter. The hand lever 12 is pivoted, at its rear end, as at 13, to the rear portion of a notched quadrant 14 secured to the post 2, and with which notched quadrant said hand lever 12 cooperates; there being a manually releasable spring-pressed latch unit 15 between the hand lever 12 and notched quadrant 14. Vertical swinging adjustment of the hand lever 12 accomplishes a corresponding vertical adjustment of the spindle 11 with respect to the driven, but fixed-position, spindle 5.

The split sleeve 3 is formed with a rearwardly projecting bracket 16 having an elongated horizontal slot 17 therein. Another horizontal spindle 18 projects laterally from the bracket 16 in the same direction as the spindles 5 and 11, being disposed in spaced relation to the rear of the former but in substantially the same horizontal plane. The spindle 18 is mounted for adjustment along the slot 17, which adjustment can be accomplished upon loosening of a nut 19 which includes an operating handle 20.

With the above described assembly of laterally projecting spindles, it will be recognized that the spindle 11 can be adjusted up and down with respect to the driven spindle 5, whereas the spindle 18 may be adjusted rearwardly or forwardly relative to said driven spindle 5. This is for the purpose of adjustment to different tire sizes; said spindles carrying tire supporting rollers as follows:

A pair of rollers 21 are disposed in axially spaced-apart relation on each of the spindles 5, 11, and 18; the rollers on the spindle 5 being keyed thereto, whereas the rollers on the spindles 11 and 18 are carried on rotary sleeves 22. The innermost roller 21 of each pair is axially non-adjustable, whereas the remaining roller of each pair is axially adjustable; being provided with a finger screw 23. The axially adjustable roller 21 on the spindle 5 includes a key 24 running in a keyway 25.

The rotary sleeves 22 are maintained in freely turnable relation on the spindles 11 and 18 by means of lubricant fed through a passage 26 in the corresponding spindle.

The rollers 21 include tire retention flanges 27 at the outer ends of said rollers, and the rollers on the spindle 5 are peripherally serrated, as shown, to assure of good frictional grip with a supported tire.

A tire 28 is supported on the described driven tire carrier in the manner illustrated in Figs. 1 and 4; the three pairs of rollers 21 being first adjusted to proper spacing to receive the tire beads 29 thereon, and thereafter the spindles 11 and 18 are adjusted vertically and horizontally, respectively, to properly engage the three pair of rollers within the tire in supporting relation thereto.

As so supported, the tire 28 is rotated at relatively slow speed from the motor 9 and driven spindle 5 in the direction indicated by the arrow in Fig. 1.

The tire 28 has previously been buffed to remove a substantial portion of the old tread, and is then treated at the periphery with a coating or layer of rubber cement. As so processed, the tire is mounted in the tread applying machine, and the relatively flat tread stock or camelback 30 is manually applied to the tire as it rotates by feeding said tread stock onto the tire at the top. The tread stock 30 is guided, as it feeds onto the tire, by the following arrangement:

The post 2, adjacent the top thereof, is fitted with a vertically adjustable split collar 31 which includes a hand screw 32. The collar 31 serves as a positioning element for another split collar 33 on the post thereabove; the split collar 33 likewise including a hand screw 34. With this arrangement, the collars are vertically adjustable on the post 2, and the collar 33 is readily adjustable in its rotative position without the possibility of accidentally lowering.

The split collar 33 is formed with a horizontal or transverse sleeve 35 through which a cross rod 36 extends in adjustable relation, which adjustment is accomplished by loosening a hand screw 37. The cross rod 36 projects laterally from the post 2 in the same direction as the spindles of the driven tire carrier, but is disposed some distance thereabove. The cross rod 36 is fitted with a pair of longitudinally adjustable collars 38 whose adjustment is accomplished by means of hand screws 39; the position of such collars on the cross rod 36 being determined by suitable scaling thereon.

Forwardly and downwardly inclined guide fingers 40 are fixed on the collars 38, and when in use are set so that the lower ends thereof run quite close to the shoulders of the tire. Thus, as the tread stock is fed onto the tire 28, at the top, the guide fingers 40 assure of its proper alinement. As the collars 38 are adjustable on the cross rod 36, and as the latter is in itself axially adjustable, the fingers 40 can be set to any size of tire.

After the tread stock 30 is applied about the periphery of the tire 28, it is necessary that heavy radially inward force be applied to said tread stock to cause its adherence or stitching to the tire carcass, previously treated with rubber cement. In the present machine the following stitcher unit is provided:

A double swivel fitting 41 is mounted on the cross rod 36 intermediate its ends, and a pressure arm 42 is fixed to, and extends forwardly from, said double swivel fitting 41. A transverse handle 43 is mounted on the pressure arm 42 at the outer end of the same.

A longitudinally adjustable sleeve 44 is mounted on the pressure arm 42, and a stitching roller 45 is suspended from the sleeve 44 by means of a castor mount 46.

The pressure arm 42 and its connected parts is normally swung laterally to an upwardly inclined, out-of-the-way position, where it rests on a hook 47 extending from the post 2. This is the position of the pressure arm 42 while the tread stock 30 is being applied to the tire.

Thereafter, the operator grasps the transverse handle 43 and swings the pressure arm 42 to a working position, as in Figs. 1 and 2, wherein the roller 45 then runs on the tread stock 30 as applied to the periphery of the tire 28. With the tire rotating on its carrier, the operator presses down on the transverse handle 43, whereby the stitching roller 45 imparts substantial pressure to the tread stock 30 to stitch it, or cause its adherence to the tire. As the stitching roller 45 is castor mounted, it is self-tracking but can be caused to ride from side to side of the tread stock 30 by corresponding lateral manipulation of the swivelly mounted pressure arm 42. In this way the operator can accomplish effective and even stitching of the tread stock 30 to the tire 28.

It is desirable that the stitching roller 45 ride the periphery of the tire at a point not too far ahead of the top center of the tire, and it is for this reason that the stitching roller 45, together with its castor mount, is made adjustable lengthwise of the pressure arm 42; this being accomplished by the use of the longitudinal adjustable sleeve 44.

The above described tire tread applying machine provides a very practical, effective, and reliable structure for use in connection with the application of tread stock to used tires preparatory to the vulcanizing process.

The machine is readily and conveniently adjustable to tires of different sizes, and in any position of adjustment thereof the driven tire carrier, the guide assembly, and the stitcher unit function with equal effectiveness.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, what is claimed as new and useful, and upon which Letters Patent are desired, is:

1. A tire tread applying machine comprising an upstanding support, a plurality of spaced, horizontal spindles projecting laterally in the same direction from the support, means journaling one spindle in connection with the support, a drive unit coupled to said one spindle, means securing a second spindle to the support rearward of said one spindle, means securing a third spindle to the support below said one spindle, and a pair of axially spaced tire supporting rollers mounted on each spindle.

2. A tire tread applying machine comprising an upstanding support, a plurality of spaced, horizontal spindles projecting laterally in the same direction from the support, means journaling one spindle in connection with the support, a drive unit coupled to said one spindle, means securing a second spindle to the support rearward of said one spindle, means securing a third spindle to the support below said one spindle, and a pair of axially spaced tire supporting rollers mounted on each spindle; the rollers on said one spindle being fixed thereon against relative rotation.

3. A tire tread applying machine comprising an upstanding support, a plurality of spaced, horizontal spindles projecting laterally in the same direction from the support, means journaling one spindle in connection with the support, a drive unit coupled to said one spindle, means securing a second spindle to the support rearward of said one spindle, means securing a third spindle to the support below said one spindle, and a pair of axially spaced tire supporting rollers mounted on each spindle; the rollers on said one spindle being fixed thereon against relative rotation, and the rollers corresponding to the second and third spindles being rotatable thereon.

4. A tire tread applying machine, as in claim 3, in which a corresponding one of each pair of rollers is axially adjustable relative to the remaining roller of the pair.

5. A tire tread applying machine comprising an upstanding support, a plurality of spaced, horizontal spindles projecting laterally in the same direction from the support, means journaling one spindle in connection with the support, a drive unit coupled to said one spindle, means securing a second spindle to the support rearward of said one spindle, means securing a third spindle to the support below said one spindle, a pair of axially spaced tire supporting rollers secured on said one spindle in relative non-rotatable relation, rotary sleeves on said second and third spindles, and pairs of axially spaced tire supporting rollers secured on said sleeves.

6. A tire tread applying machine comprising an upstanding support, a plurality of spaced, horizontal spindles projecting laterally in the same direction from the support, means journaling one spindle in connection with the support, a drive unit coupled to said one spindle, means securing a second spindle to the support rearward of said one spindle, means securing a third spindle to the support below said one spindle, a pair of axially spaced tire supporting rollers secured on said one spindle in relative non-rotatable relation, rotary sleeves on said second and third spindles, and pairs of axially spaced tire supporting rollers secured on said sleeves; a corresponding roller of each of the three pairs being axially adjustable.

7. A tire tread applying machine comprising an upstanding support, a plurality of spaced, horizontal spindles projecting laterally in the same direction from the support, means journaling one spindle in connection with the support, a drive unit coupled to said one spindle, means securing a second spindle to the support rearward of said one spindle, means securing a third spindle to the support below said one spindle, and a pair of axially spaced tire supporting rollers mounted on each spindle; the securing means for said third and second spindles mounting the same for up and down, and back and forth adjustment, respectively.

8. A tire tread applying machine comprising an upstanding post, a driven spindle journaled in connection with the post and projecting laterally therefrom, another laterally projecting spindle disposed rearward of the driven spindle parallel thereto, means mounting said other spindle in connection with the post for back and forth adjustment; a third laterally projecting spindle disposed below the driven spindle parallel thereto, means mounting said third spindle in connection with the post for up and down adjustment, and a pair of axially spaced tire supporting rollers on each spindle, the pair on the driven spindle being rotated thereby.

9. A tire tread applying machine comprising an upstanding post, a driven spindle journaled in connection with the post and projecting laterally therefrom, another laterally projecting spindle disposed rearward of the driven spindle parallel thereto, means mounting said other spindle in connection with the post for back and forth adjustment, a third laterally projecting spindle disposed below the driven spindle parallel thereto, means mounting said third spindle in connection with the post for up and down adjustment, and a pair of axially spaced tire supporting rollers on each spindle, the pair on the driven spindle being rotated thereby; a corresponding one of each pair of rollers being axially adjustable.

10. A tire tread applying machine comprising an upstanding post, a driven spindle journaled in connection with the post and projecting laterally therefrom, another laterally projecting spindle disposed rearward of the driven spindle parallel thereto, means mounting said other spindle in connection with the post for back and forth adjustment, a third laterally projecting spindle disposed below the driven spindle parallel thereto, means mounting said third spindle in connection with the post for up and down adjustment, and a pair of axially spaced tire supporting rollers on each spindle, the pair on the driven spindle being rotated thereby; the mounting means for said other spindle being a rearwardly projecting bracket having a longitudinal slot therethrough, the adjacent end of said other spindle being secured in adjustable relation through said slot.

11. A tire tread applying machine comprising an upstanding post, a driven spindle journaled in connection with the post and projecting laterally therefrom, another laterally projecting spindle disposed rearward of the driven spindle parallel thereto, means mounting said other spindle in connection with the post for back and forth adjustment, a third laterally projecting spindle disposed below the driven spindle parallel thereto, means mounting said third spindle in connection with the post for up and down adjustment, and a pair of axially spaced tire supporting rollers on each spindle, the pair on the driven spindle being rotated thereby; the mounting means for said third spindle being a vertically swingable hand lever from which said spindle projects laterally; there being a latch unit cooperating with the hand lever to releasably secure the same in selective positions of adjustment.

12. A tire tread applying machine comprising an upstanding post, a driven spindle journaled in connection with the post and projecting laterally therefrom, another laterally projecting spindle disposed rearward of the driven spindle parallel thereto, means mounting said other spindle in connection with the post for back and forth adjustment, a third laterally projecting spindle disposed below the driven spindle parallel thereto, means mounting said third spindle in connection with the post for up and down adjustment, and a pair of axially spaced tire supporting rollers on each spindle, the pair on the driven spindle being rotated thereby; the mounting means for said third spindle being a vertically swingable hand lever from which said spindle projects laterally; there being a latch unit cooperating with the hand lever to releasably secure the same in selective positions of adjustment, said latch unit including a notched quadrant, and a spring pressed latch cooperating therewith.

13. A tire tread applying machine, comprising an upstanding post, a driven tire carrier mounted on the post adapted to support a tire substantially vertically alongside the post and to rotate said tire, a cross member projecting laterally from the post above the tire, and a pair of guide fingers depending in spaced relation from the cross member to points adjacent corresponding shoulders of the tire whereby to guide tread stock onto said tire upon rotation of the latter.

14. A tire tread applying machine, comprising an upstanding post, a driven tire carrier mounted on the post adapted to support a tire substantially vertically alongside the post and to rotate said tire, a cross member projecting laterally from the post above the tire, and a pair of guide fingers depending in spaced relation from the cross member to points adjacent corresponding shoulders of the tire whereby to guide tread stock onto said tire upon rotation of the latter; said guide fingers being disposed at a forward and downward incline from the cross member, the latter crossing the tire at substantially top center thereof.

15. A tire tread applying machine, comprising an upstanding post, a driven tire carrier mounted on the post adapted to support a tire substantially vertically alongside the post and to rotate said tire, a cross member projecting laterally from the post above the tire, and a pair of guide fingers depending in spaced relation from the cross member to points adjacent corresponding shoulders of the tire whereby to guide tread stock onto said tire upon rotation of the latter; the cross member being adjustable axially, and up and down the post.

16. A tire tread applying machine, comprising an upstanding post, a driven tire carrier mounted on the post adapted to support a tire substantially vertically alongside the post and to rotate said tire, a cross member projecting laterally from the post above the tire, and a pair of guide fingers depending in spaced relation from the cross member to points adjacent corresponding shoulders of the tire whereby to guide tread stock onto said tire upon rotation of the latter; the cross member being adjustable axially, and up and down the post, and the guide fingers being adjustable along said cross member.

EDWIN A. GLYNN.

REFERENCES CITED

The following references are of record in the file of this patent:

UNITED STATES PATENTS

| Number | Name | Date |
| --- | --- | --- |
| 1,194,565 | Stevens | Aug. 15, 1916 |
| 1,311,578 | Stilson | July 29, 1919 |
| 1,768,341 | Stevens | June 24, 1930 |
| 2,085,650 | Godfrey | June 29, 1937 |
| 2,474,511 | Bacon | June 28, 1949 |